(12) United States Patent
Lu et al.

(10) Patent No.: US 11,397,788 B2
(45) Date of Patent: Jul. 26, 2022

(54) QUERY PROCESSING METHOD AND DEVICE, AND COMPUTER READABLE MEDIUM

(71) Applicant: BEIJING BAIDU NETCOM SCIENCE AND TECHNOLOGY CO., LTD., Beijing (CN)

(72) Inventors: Jiajun Lu, Beijing (CN); Zenan Lin, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 94 days.

(21) Appl. No.: 16/795,268

(22) Filed: Feb. 19, 2020

(65) Prior Publication Data

US 2020/0272675 A1     Aug. 27, 2020

(30) Foreign Application Priority Data

Feb. 21, 2019  (CN) .......................... 201910130355.5

(51) Int. Cl.
```
G06F 7/00        (2006.01)
G06F 16/9536     (2019.01)
G06F 16/906      (2019.01)
G06F 16/903      (2019.01)
G06F 16/9538     (2019.01)
```

(52) U.S. Cl.
CPC ........ G06F 16/9536 (2019.01); G06F 16/906 (2019.01); G06F 16/90344 (2019.01); G06F 16/9538 (2019.01)

(58) Field of Classification Search
CPC .............. G06F 16/9536; G06F 16/906; G06F 16/90344; G06F 16/245; G06F 16/2465; G06F 16/3331; G06F 16/835; G06F 16/90335

See application file for complete search history.

(56) References Cited

U.S. PATENT DOCUMENTS

| | | | |
|---|---|---|---|
| 6,175,829 B1 * | 1/2001 | Li | ........................... G06F 16/58 |
| 6,363,378 B1 * | 3/2002 | Conklin | .............. G06F 16/3325 |

(Continued)

FOREIGN PATENT DOCUMENTS

| | | |
|---|---|---|
| CN | 102279872 A | 12/2011 |
| CN | 103106220 A | 5/2013 |

(Continued)

OTHER PUBLICATIONS

Japanese Patent Application No. 2020-027637 Office Action dated Feb. 2, 2021, 4 pages.

(Continued)

*Primary Examiner* — Mohammed R Uddin
(74) *Attorney, Agent, or Firm* — Lathrop GPM LLP

(57) ABSTRACT

The present disclosure provides a query processing method. The method includes: determining a query feedback based on a received query request including a character string; determining a target candidate entity set based on the query feedback, the character string and a preset knowledge base; evaluating each target candidate entity in the target candidate entity set to obtain evaluation results; and determining a category of each target candidate entity based on the evaluation result of the target candidate entity.

16 Claims, 3 Drawing Sheets

(56) References Cited

U.S. PATENT DOCUMENTS

| | | | |
|---|---|---|---|
| 7,747,648 B1* | 6/2010 | Kraft | G06F 16/288 |
| | | | 707/790 |
| 9,418,128 B2 | 8/2016 | Li | |
| 9,594,831 B2* | 3/2017 | Wang | G06F 40/295 |
| 10,803,050 B1* | 10/2020 | Salkola | G06F 16/2365 |
| 2009/0299990 A1* | 12/2009 | Setlur | G06F 16/58 |
| 2013/0110754 A1* | 5/2013 | Ravindra | G06Q 30/02 |
| | | | 706/46 |
| 2013/0110992 A1* | 5/2013 | Ravindra | H04W 8/18 |
| | | | 709/220 |
| 2013/0212081 A1* | 8/2013 | Shenoy | G06F 16/3331 |
| | | | 707/706 |
| 2013/0332438 A1* | 12/2013 | Li | G06F 16/9535 |
| | | | 707/706 |
| 2014/0164367 A1* | 6/2014 | Lee | G06F 16/3322 |
| | | | 707/723 |
| 2015/0081660 A1* | 3/2015 | Margulis | G06Q 30/0263 |
| | | | 707/706 |
| 2015/0278691 A1* | 10/2015 | Xia | G06F 16/90344 |
| | | | 706/11 |
| 2015/0363476 A1 | 12/2015 | Li | |
| 2016/0041986 A1* | 2/2016 | Nguyen | G06Q 50/01 |
| | | | 707/711 |
| 2016/0117405 A1 | 4/2016 | Zhang et al. | |
| 2017/0193099 A1 | 7/2017 | Ben-Tzur et al. | |
| 2017/0329867 A1* | 11/2017 | Lindsley | G06N 20/00 |
| 2018/0032514 A1* | 2/2018 | Venkataraman | G06F 16/48 |
| 2018/0232376 A1 | 8/2018 | Zhu et al. | |
| 2019/0042988 A1* | 2/2019 | Brown | G06F 16/9535 |
| 2019/0164063 A1* | 5/2019 | Moura | G06F 16/90332 |
| 2019/0197176 A1* | 6/2019 | Luo | H04L 63/102 |
| 2019/0347358 A1* | 11/2019 | Mishra | G06F 16/332 |

FOREIGN PATENT DOCUMENTS

| | | |
|---|---|---|
| CN | 103688260 A | 3/2014 |
| CN | 103995880 A | 8/2014 |
| CN | 104239340 A | 12/2014 |
| CN | 108280081 A | 7/2018 |
| CN | 108345702 A | 7/2018 |
| CN | 108733779 A | 8/2018 |
| CN | 108604463 A | 9/2018 |
| CN | 108959613 A | 12/2018 |
| CN | 109033140 A | 12/2018 |
| CN | 109299289 A | 2/2019 |
| CN | 109344174 A | 2/2019 |
| EP | 3554040 A1 | 10/2019 |
| JP | 2013534673 A | 9/2013 |
| JP | 5608286 B2 | 10/2014 |
| JP | 2017518588 A | 7/2017 |

OTHER PUBLICATIONS

Japanese Patent Application No. 2020-027637 English translation of Office Action dated Feb. 2, 2021, 4 pages.

Korean Patent Application No. 1020190158016 Office Action dated Nov. 17, 2020, 7 Pages.

Korean Patent Application No. 1020190158016 English translation of Office Action dated Nov. 17, 2020, 7 Pages.

European Patent Application No. 20157560.2 extended Search and Opinion dated May 27, 2020, 10 pages.

Chinese Patent Application No. 201910130355.5 First Office Action dated Aug. 5, 2020, 7 pages.

Chinese Patent Application No. 201910130355.5 English translation of First Office Action dated Aug. 5, 2020, 5 pages.

* cited by examiner

QUERY PROCESSING METHOD AND DEVICE, AND COMPUTER READABLE MEDIUM

CROSS-REFERENCE TO RELATED APPLICATIONS

This application is based on and claims priority to Chinese Patent Application Serial No. 201910130355.5, filed on Feb. 21, 2019, the entire contents of which are incorporated herein by reference.

TECHNICAL FIELD

The present disclosure relates to a field of artificial intelligence technology, and more particularly, to a query processing method, a query processing device, and a computer readable medium.

BACKGROUND

Recently, with the development of artificial intelligence technology, computers have achieved many results having application value in natural language understanding.

Due to the diversity and complexity of semantic and sentence structure, there are certain difficulties in extracting text directly. Methods in the related art mainly focus on extracting keywords in text, and the methods are mainly divided into two categories, i.e., statistical analysis-base method and semantic analysis-base method.

SUMMARY

Embodiments of the present disclosure provide a query processing method, a query processing device, and a computer readable medium.

In a first aspect, the embodiments of the present disclosure provide a query processing method. The method includes: determining a query feedback based on a received query request comprising a character string; determining a target candidate entity set based on the query feedback, the character string and a preset knowledge base; evaluating each target candidate entity in the target candidate entity set to obtain evaluation results, in which a target candidate entity corresponds to an evaluation result; and determining a category of each target candidate entity based on the evaluation result of the target candidate entity.

In some embodiments, determining the target candidate entity set based on the query feedback, the character string and the preset knowledge base, includes: determining a first candidate entity subset based on the query feedback and the character string; determining a second candidate entity subset from the preset knowledge base based on the character string; and determining the target candidate entity set based on the first candidate entity subset and the second candidate entity subset.

In some embodiments, evaluating each target candidate entity in the target candidate entity set, includes: inputting the target candidate entity set and the query feedback respectively to a dual-channel model, to obtain the evaluation results corresponding to respective target candidate entities.

In some embodiments, determining the category of each target candidate entity based on the evaluation result of the target candidate entity, includes: comparing the evaluation result of a target candidate entity with a preset result; and determining the target candidate entity as an entity of a first category when the evaluation result of the target candidate entity meets at least one conditions of: the evaluation result of the target candidate entity being superior to the preset result; and the evaluation result of the target candidate entity being identical to the preset result.

In some embodiments, after comparing the evaluation result of the target candidate entity with the preset result, the method includes: determining the target candidate entity as an entity of a second category when the evaluation result of the target candidate entity is inferior to the preset result.

In some embodiments, after determining the target candidate entity as the entity of the first category the method further includes: determining a search intent entity corresponding to the received query request based on the target candidate entity set and the evaluation results corresponding to respective target candidate entities.

In some embodiments, determining the search intent entity corresponding to the received query request based on the target candidate entity set and the evaluation results corresponding to respective target candidate entities, includes: selecting an optimal evaluation result from the evaluation results corresponding to respective target candidate entities; and determining the target candidate entity corresponding to the optimal evaluation result as the search intent entity.

In some embodiments, the query feedback includes one or more of news, information, related search, encyclopedia, and post bar.

In a second aspect, the embodiments of the present disclosure provide a query processing device. The device includes: a searching module, configured to determine a query feedback based on a received query request comprising a character string; a determining module, configured to determine a target candidate entity set based on the query feedback, the character string and a preset knowledge base; an evaluating module, configured to evaluate each target candidate entity in the target candidate entity set to obtain evaluation results, in which a target candidate entity corresponds to an evaluation result; and a classifying module, configured to determine a category of each target candidate entity based on the evaluation result of the target candidate entity.

In some embodiments, the determining module is configured to: determine a first candidate entity subset based on the query feedback and the character string; determine a second candidate entity subset from the preset knowledge base based on the character string; and determine the target candidate entity set based on the first candidate entity subset and the second candidate entity subset.

In some embodiments, the evaluating module is configured to input the target candidate entity set and the query feedback respectively to a dual-channel model, to obtain the evaluation results corresponding to respective target candidate entities.

In some embodiments, the classifying module is configured to compare the evaluation result of a target candidate entity with a preset result; and determine the target candidate entity as an entity of a first category when the evaluation result of the target candidate entity meets at least one conditions of: the evaluation result of the target candidate entity being superior to the preset result; and the evaluation result of the target candidate entity being identical to the preset result.

In some embodiments, the classifying module is configured to determine the target candidate entity as an entity of a second category when the evaluation result of the target candidate entity is inferior to the preset result.

In some embodiments, the classifying module is configured to determine a search intent entity corresponding to the received query request based on the target candidate entity set and the evaluation results corresponding to respective target candidate entities.

In some embodiments, the classifying module is configured to: select an optimal evaluation result from the evaluation results corresponding to respective target candidate entities; and determine the target candidate entity corresponding to the optimal evaluation result as the search intent entity.

In a third aspect, the embodiments of the present disclosure provide a computer readable medium having a computer program stored thereon. When the computer program is executed by a processor, the above method is implemented.

The technical solution according to the embodiments of the present disclosure can determine the category of the query, so as to accurately determine the intent of the user to input the query, which may reduce the search cost, such as computing resources, network resources, and query time, thereby improving user experience.

Specifically, the solution for acquiring the target candidate entity set adopted by the embodiments of the present disclosure can accurately select the target candidate entity corresponding to the query by combining with the features such as the query feedback and the knowledge base. Moreover, based on the solution for obtaining the evaluation result of each target candidate entity adopted by the embodiments of the present disclosure, it is possible to efficiently and accurately evaluate each target candidate entity, thereby realizing the technical effect of accurately determining the category of the query. Since the categories of the queries can be accurately distinguished, the efficiency of searching can be improved and the search cost can be reduced for the user. Furthermore, since the category of the query can be accurately determined, the accuracy of the result pushed to the user can be improved and the recall rate can be improved.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure, rather than to limit the present disclosure. The above and/or additional aspects and advantages of embodiments of the present disclosure will become apparent and more readily appreciated from the following descriptions made with reference to the drawings, in which.

Figure 1:
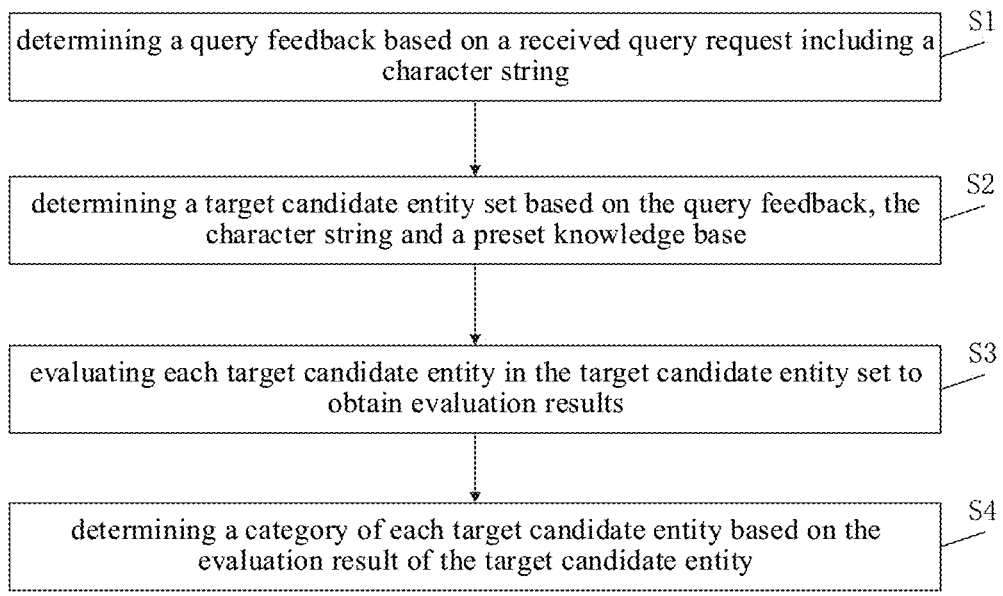
FIG. 1 is a flow chart of a query processing method according to an embodiment of the present disclosure.

REFERENCE NUMERALS searching module 1, set determining module 2, evaluating module 3, category classifying module 4, processing unit (or processor) 11, memory 12, bus 13, RAM 14, cache 15, storage system 16, program component 17, utilities 18, external device 19, display 20, I/O interface 21, network adapter 22.

DETAILED DESCRIPTION

In order to enable those skilled in the art to better understand the technical solutions of the present disclosure, a query processing method, a query processing device and a computer readable medium according to the present disclosure are described in detail below with reference to the accompanying drawings.

The exemplary embodiments are described more fully hereinafter with reference to the accompanying drawings, but these exemplary embodiments may take different forms and should not be interpreted as limited to the embodiments explicitly set forth herein. Rather, these embodiments are provided so that this disclosure will be thorough and complete, and will fully convey the scope of the present disclosure to those skilled in the art.

The term "and/or" as used herein includes any and all combinations of one or more of the associated listed items.

The terms used herein are for the purpose of describing particular embodiments, and not intended to limit this disclosure. The singular forms "a", "an" and "the" are also intended to include the plural forms, unless indicated otherwise. It is understood that the terms "include", "comprise" and/or "made of", when used in this disclosure, specify the presence of the features, entities, steps, operations, elements and/or components, but do not exclude the presence or the addition of one or more other features, entities, steps, operations, elements, components and/or groups thereof.

Exemplary embodiments are described herein with reference to plan illustrations and/or cross section illustrations that are schematic illustrations of idealized embodiments. As such, variations from the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. Thus, the regions illustrated in the figures are schematic in nature and their shapes are not intended to illustrate the precise shape of a region and are not intended to limit the scope of the present claims.

All terms (including technical and scientific terms) used herein have the same meaning as commonly understood by those skilled in the art, unless otherwise defined. It is understood that those terms such as those defined in commonly used dictionaries should be interpreted as having a meaning consistent with their meaning in the context of the related art and the present disclosure, and will not be interpreted in an idealized or overly formal sense, unless specifically defined herein.

According to an aspect of the embodiments of the present disclosure, the embodiments of the present disclosure provide a query processing method.

FIG. 1 is a flow chart of a query processing method according to an embodiment of the present disclosure. The query processing method is applicable to a query processing device, such as a server device.

As illustrated in FIG. 1, the method includes the following acts.

At block S1, a query feedback is determined based on a received query request including a character string.

In some embodiments, the user sends a query request, i.e., a query, to the server device through a terminal. Specifically, the terminal may be a mobile device such as a mobile phone, a laptop tablet, and a personal digital assistant, or may be a fixed device such as a desktop computer. The query request is composed of strings. It is understood that the "character string" recited herein may include a sequence of one or more of text, numbers, letters, symbols in text form. The server device initiates a search according to the user query, and obtains the query feedback corresponding to the user query. It is appreciated that the search may be performed through the network based on network resources such as web page, or may be performed locally on various locally-stored databases.

In some embodiments, query feedback refers to a corresponding result obtained by searching with the user query, i.e., one or more of information such as news, message, related search query, and BBS. Query feedback is usually accessible by the user. Therefore, the query feedback can be changed according to a large number of user behaviors. For example, information with high click rate is presented to the user as a result of the query request i.e., as the query feedback, and information with low click rate may be ignored. It can be understood that the presentation of the query feedback is not only based on the click rate, but may also depend on other basis, which is not limited herein.

Since the query feedback can vary based on a large number of user behaviors, the query feedback is time-efficient. The query feedbacks obtained with regard to the same query request in different time periods may be different. Moreover, the degrees of attention of the same query feedback in different time periods are also different. In the following, take the query request of "Bumblebee" as an example for explanation. Before the broadcast of a film "Bumblebee", "Bumblebee" was known as a virtual character in Transformers. That is, before the Transformers were released, and the film "Bumblebee" was broadcasted, "Bumblebee" was known as the virtual character in the Transformers. However, after the film "Bumblebee" was launched, "Bumblebee" was more likely to be searched by people as a movie. That is, as time goes on, a large number of user behaviors (for example, clicks) are constantly changing, and the query feedback is continuously updated accordingly. Therefore, the technical solution of the embodiments of the present disclosure can obtain different query feedbacks at different times with regard to the same query request. That is, the timeliness of the query feedback can be improved according to the solution provided by the embodiments of the present disclosure.

At block S2, a target candidate entity set is determined based on the query feedback, the character string and a preset knowledge base.

In this block, the target candidate entity set corresponding to the character string may be determined based on the query feedback and the knowledge base. The term "knowledge base" refers to a data structure similar to a graph, which is composed of nodes and edges, such as a knowledge graph or other suitable databases. In the knowledge base, each node represents an "entity" that exists in the real world, and each edge represents a "relationship" between entities. The knowledge base is an effective representation of relationships. In other words, the knowledge base links different kinds of information to form a relational network, to achieve an ability of analyzing problems from a 'relational" perspective.

Figure 2:
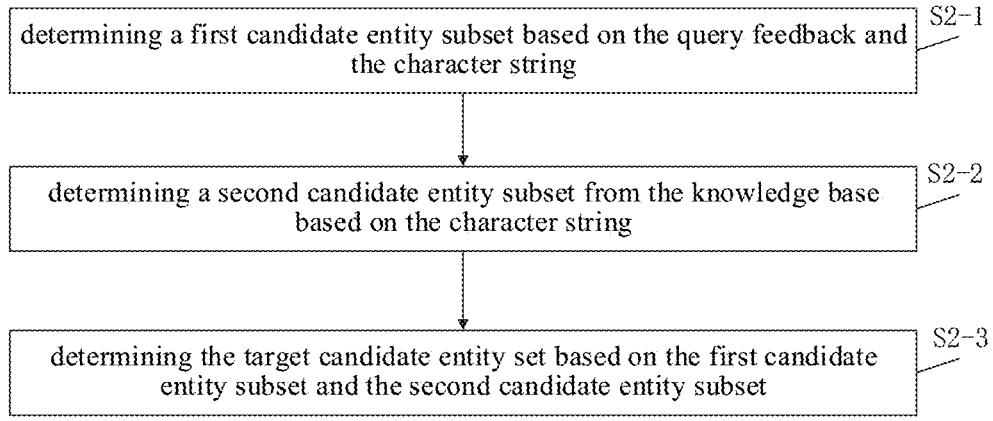
FIG. 2 is a flow chart of a method of determining a target candidate entity set according to an embodiment of the present disclosure.

As illustrated in FIG. 2, in some embodiments, block S2 may include the following acts.

At block S2-1, a first candidate entity subset is determined based on the query feedback and the character string. The first candidate entity subset includes candidate entities corresponding to the character string. The candidate entities may be all or a part of candidate entities corresponding to a particular character string. The part of candidate entities may be selected according to different situations. For example, when computing resources or network resources are limited, a plurality of candidate entities or entity items with higher priority may be selected according to a weight or other parameters of each candidate entity or each entity item. The specific selection method is not limited herein.

In some embodiments, the first candidate entity subset may be obtained by performing a computation on the query feedback and the character string. Specifically, for example, a multi-mode matching algorithm may be used to match the character string with the query feedback to extract all or a part of the candidate entities from the corresponding query feedbacks. It is understood that the algorithm for matching the character string with the query feedback to obtain the candidate entity may be any algorithm capable of implementing the function, which is not limited herein.

At block S2-2, a second candidate entity subset is determined from the knowledge base based on the character string. The second candidate entity subset includes candidate entities corresponding to the character string, and entity items corresponding to the candidate entities. The item can be, for example, an entry, and an article, and it refers to narrative content of objects with different conceptual meanings. The entity items of the candidate entity may be all or a part of entity items corresponding to the candidate entity. The part of candidate entities and entity items can be selected according to different situations. The specific selection method is not limited herein.

Preferably, based on information of entities in the knowledge base that have mutual relationships, a plurality of entity items associated with the character string are selected from the knowledge base, and the set consisting of the plurality of the entity items is configured as the second candidate entity subset.

At block S2-3, a target candidate entity set is determined based on the first candidate entity subset and the second candidate entity subset. Specifically, two subsets, that is, the first candidate entity subset and the second candidate entity subset, are combined as the target candidate entity set.

It should be noted that there is no inevitable sequence between block S2-1 and block S2-2. That is, the step of acquiring the first candidate entity subset may be performed preferentially, or the step of acquiring the second candidate entity subset may be performed preferentially, and the step of acquiring the first candidate entity subset and the step of t acquiring the second candidate entity subset may be performed simultaneously.

At block S3, each target candidate entity in the target candidate entity set is evaluated to obtain evaluation results, in which one target candidate entity corresponds to one evaluation result. Each target candidate entity in the target candidate entity set can be evaluated using evaluation methods in the prior art, for example, sorting the target candidate entities in the target candidate entity set, or calculating a score of each target candidate entity in the target candidate entity set. The specific evaluation method is not limited herein.

In some embodiments, block S3 may include: inputting the target candidate entity set and the query feedback respectively to a dual-channel model, to obtain the evaluation results corresponding to respective target candidate entities.

Specifically, the target candidate entity set and the query feedback are respectively input to the dual-channel model, and then the evaluation results corresponding to respective target candidate entities are output. Preferably, the dual-channel model is a dual-channel LSTM (Long-Short Term Memory) model. The dual-channel LSTM model accurately distinguishes each target candidate entity in the target candidate entity set and outputs the evaluation result corresponding to the target candidate entity.

When each target candidate entity is evaluated using the dual-channel LSTM model, the evaluation result is a score.

Specifically, the target candidate entity set is input to one end of the dual-channel LSTM model (i.e., one channel of the dual-channel LSTM model), and the query feedback is input to the other end of the dual-channel LSTM model (i.e., another channel of the dual-channel LSTM model). In the disclosed embodiment, by utilizing the dual-channel LSTM model, the query feedback and the knowledge base, the problem of querying entity name, entity alias, entity plus information (i.e., knowledge information) and realizing error correction in the field of query processing may be solved.

At block S4, a category of each target candidate entity is determined based on the evaluation result of the target candidate entity.

In some embodiments, the categories include a cognitive need category and a non-cognitive need category. An entity of cognitive need includes the entity name and the entity information, that is, the entity of cognitive need is a well-defined entity. An entity of non-cognitive need is an entity that is not well-defined.

Specifically, after block S2, the target candidate entity set is obtained. The target candidate entity set includes the first candidate entity subset and the second candidate entity subset. A plurality of target candidate entities are included in the first candidate entity subset. The second candidate entity subset includes a plurality of target candidate entities, and entity items corresponding to the target candidate entities. Since one target candidate entity corresponds to at least one entity item while one entity item corresponds to only one target candidate entity, based on the target candidate entity set, an association relationship between each target candidate entity and each entity item in the target candidate entity set may be determined. The evaluation process is a process of matching each target candidate entity in the target candidate entity set (when a target candidate entity includes at least one entity item, matching the target candidate entity and each entity item corresponding thereto) respectively with the query feedback. Moreover, in some embodiments, matching the combination of the entity item and the target candidate entity with the query feedback can achieve comprehensiveness and sufficiency of the matching result. The matching result is the evaluation result. Specifically, the matching can be performed by calculation (such as a similarity calculation), or through a model (such as a neural network model). The matching method is not limited here.

One of the specific implementation manners of performing the matching by calculation will be described as follows: performing a similarity calculation on any target candidate entity in the target candidate entity set and the query feedback (if the target candidate entity includes at least one entity item, the target candidate entity and each entity item corresponding thereto are taken as a whole to be matched with the query feedback), and the similarity (i.e., the evaluation result) of the target candidate entity is obtained. The similarity is compared to a preset similarity threshold (i.e., a preset result). If the similarity is greater than or equal to the similarity threshold, the target candidate entity is determined as an entity of cognitive need. If the similarity is less than the similarity threshold, the target candidate entity is determined to be an entity of non-cognitive need.

One of the specific implementation manners of performing the matching through the model will be described as follows: each target candidate entity in the target candidate entity set is input to the dual-channel LSTM model through one channel of the dual-channel LSTM model, and the query feedback is input to the dual-channel LSTM model through another channel of the dual-channel LSTM model. The dual-channel LSTM model evaluates each target candidate entity based on the query feedback. The evaluation methods include, but are not limited to, scoring each target candidate entity. That is, the dual-channel LSTM model outputs the score (i.e., the evaluation result) corresponding to each target candidate entity based on the query feedback. Specifically, the dual-channel LSTM model outputs a score of a target candidate entity as C (i.e., an evaluation result of the target candidate entity), and the preset score threshold (i.e., the preset result) is D. If $C \geq D$, then the target candidate entity is determined as an entity of cognitive need. If $C<D$, the target candidate entity is determined to be an entity of non-cognitive need.

Figure 3:
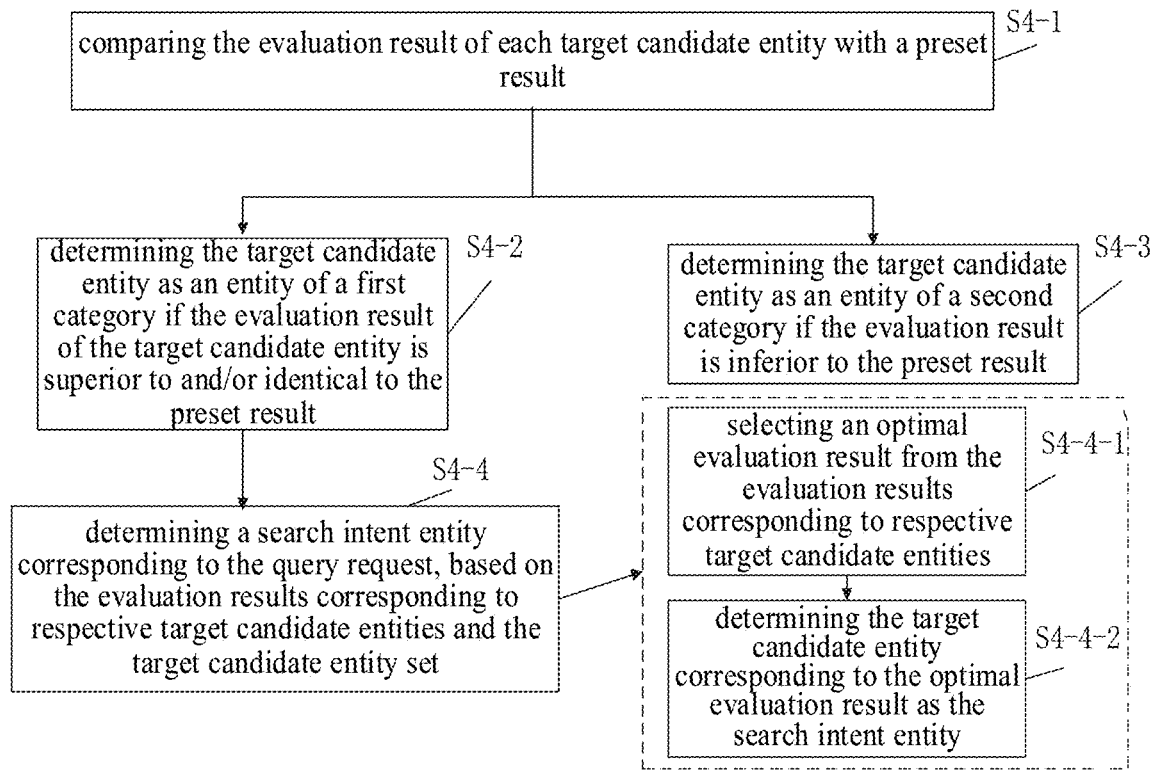
FIG. 3 is a flow chart of a method of determining a category of each target candidate entity according to an embodiment of the present disclosure.

As illustrated in FIG. 3, in some embodiments, block S4 includes the following acts.

At block S4-1, the evaluation result of each target candidate entity is compared with the preset result respectively. If the evaluation result of the target candidate entity is superior to or identical to the preset result, block S4-2 is executed, otherwise, block S4-3 is executed.

At block S4-2, if the evaluation result of the target candidate entity is superior to and/or identical to the preset result, the target candidate entity is determined as an entity of a first category.

At block S4-3, if the evaluation result of the target candidate entity is inferior to the preset result, the target candidate entity is determined as an entity of a second category.

The entity of the first category is an entity of cognitive need, and the entity of the second category is an entity of non-cognitive need.

In some embodiments, if there are a total of m target candidate entities in the target candidate entity set, each of the evaluation results of the m target candidate entities is compared with the preset result.

It is understood that there are two possibilities of the comparison of the evaluation result of a certain target candidate entity with the preset result. One is that the evaluation result of the target candidate entity is superior to or identical to the preset result, and the other is that the evaluation result of the target candidate entity is inferior to the preset result. If the evaluation result of the target candidate entity is superior to or identical to the preset result, the target candidate entity is determined as the entity of the first category; if the evaluation result of the target candidate entity is inferior to the preset result, the target candidate entity is determined as the entity of the second category.

The solution for acquiring the target candidate entity set adopted by the embodiments of the present disclosure can accurately select the target candidate entity corresponding to the query by combining with the features such as the query feedback and the knowledge base. Moreover, based on the solution for obtaining the evaluation result of each target candidate entity adopted by the embodiments of the present disclosure, it is possible to efficiently and accurately evaluate each target candidate entity, thereby realizing the technical effect of accurately determining the category of the query. Since the categories of the queries can be accurately distinguished, the efficiency of searching can be improved and the search cost can be reduced for the users. Furthermore, since the category of the query can be accurately determined, the accuracy of the result pushed to the user can be improved and the recall rate can be improved.

As illustrated in FIG. 3, in some embodiments, after block S4-2, the method further includes the following acts.

At block S4-4, a search intent entity corresponding to the query request is determined based on the target candidate entity set and the evaluation results corresponding to respective target candidate entities. The search intent entity refers to the entity that best reflects the query request. That is, the search intent entity is the entity corresponding to the query result that best reflects the user's expectation.

As illustrated in FIG. 3, in some embodiments, block S4-4 further includes the following acts.

At block S4-4-1, an optimal evaluation result is selected from the evaluation results corresponding to respective target candidate entities.

At block S4-4-2, the target candidate entity corresponding to the optimal evaluation result is determined as the search intent entity.

In some embodiments, one target candidate entity corresponds to one evaluation result (there may be cases where the evaluation results corresponding to different target candidate entities are the same), that is, m target candidate entities have a total of m evaluation results. The m evaluation results are arranged in descending or ascending order, and the optimal evaluation result is selected. The target candidate entity corresponding to the optimal evaluation result is determined as the search intent entity. That is, the target candidate entity (i.e., the search intent entity) corresponding to the optimal evaluation result is the entity that best represents a true search intent of the query request. Through the solution provided by the embodiments of the present disclosure, it is possible to efficiently and accurately determine the true intent of the user, thereby feeding back the corresponding card to the user, and enhancing the user's search experience.

According to another aspect of the embodiments, a query processing device is provided.

Figure 4:
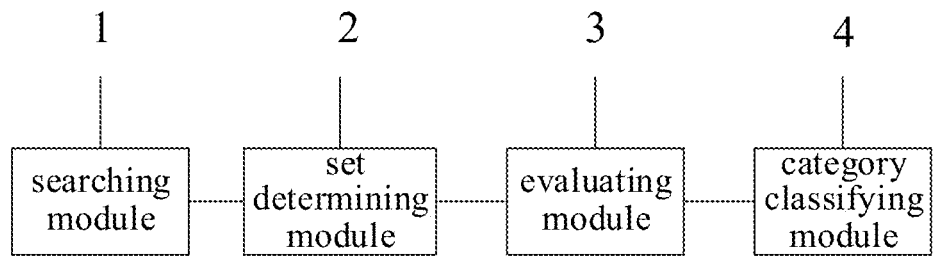
FIG. 4 is a block diagram of a query processing device according to an embodiment of the present disclosure.

FIG. 4 is a block diagram of a query processing device according to an embodiment of the present disclosure.

As illustrated in FIG. 4, the device includes: a searching module 1, a set determining module 2, an evaluating module 3 and a category classifying module 4.

The searching module 1 is configured to determine a query feedback based on a received query request including a character string.

The set determining module 2 is configured to determine a target candidate entity set based on the query feedback, the character string and a preset knowledge base.

The evaluating module 3 is configured to evaluate each target candidate entity in the target candidate entity set to obtain evaluation results, in which one target candidate entity corresponds to one evaluation result.

The category classifying module 4 is configured to determine a category of each target candidate entity according to the evaluation result of the target candidate entity.

In some embodiments, the set determining module 2 is configured to: determine a first candidate entity subset based on the query feedback and the character string; determine a second candidate entity subset from the preset knowledge base based on the character string; and determine the target candidate entity set based on the first candidate entity subset and the second candidate entity subset.

In some embodiments, the evaluating module is configured to input the target candidate entity set and the query feedback respectively to a dual-channel model, to obtain the evaluation results corresponding to respective target candidate entities.

In some embodiments, the category classifying module 4 is configured to compare the evaluation result of a target candidate entity with a preset result and determine the target candidate entity as an entity of a first category when the evaluation result of the target candidate entity meets at least one conditions of: the evaluation result of the target candidate entity being superior to the preset result; and/or the evaluation result of the target candidate entity being identical to the preset result.

In some embodiments, the category classifying module 4 is configured to determine the target candidate entity as an entity of a second category when the evaluation result of the target candidate entity is inferior to the preset result.

In some embodiments, the category classifying module 4 is configured to determine a search intent entity corresponding to the received query request based on the target candidate entity set and the evaluation results corresponding to respective target candidate entities.

In some embodiments, the category classifying module 4 is configured to: select an optimal evaluation result from the evaluation results corresponding to respective target candidate entities; and determine the target candidate entity corresponding to the optimal evaluation result as the search intent entity.

In some embodiments, the query feedback includes one or more of news, information, related search, encyclopedia, and post bar.

Figure 5:
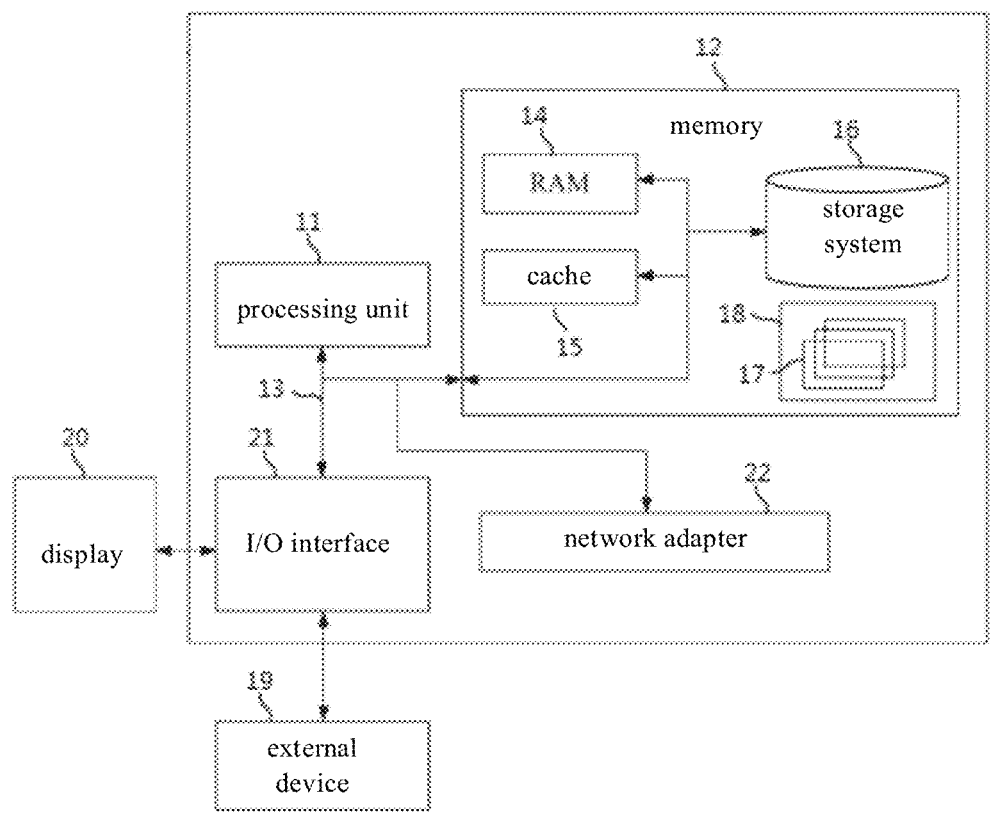
FIG. 5 is a schematic diagram of a query processing device according to an embodiment of the present disclosure.

FIG. 5 is a schematic diagram of a query processing device according to an embodiment of the present disclosure.

The query processing device illustrated in FIG. 5 is merely an example and should not impose any limitation on the function and scope of usage of the embodiments of the present disclosure.

As illustrated in FIG. 5, the query processing device may be represented via a general computer device form. Components of the query processing device may include but are not limited to one or more processors or processing units 11, a memory 12, a bus 13 connecting various system components including the memory 12 and the processing units 11.

The bus 13 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The query processing device typically includes a variety of computer system readable media. The media may be any available media accessible by the query processing device and includes volatile and non-volatile media, removable and non-removable media.

The memory 12 may include a computer system readable medium in the form of volatile memory, such as a random access memory (hereinafter referred to as RAM) 14 and/or a high speed cache memory 15. The query processing device may further include other removable or non-removable, volatile or non-volatile computer system storage media. By way of example only, the storage system 16 may be configured to read and write a non-removable and non-volatile magnetic media (not shown in FIG. 5, commonly referred to as a "hard drive"). Although not shown in FIG. 5, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 13 via one or more data medium interfaces. The memory 12 may include at least one program product. The program product has a set (such as, at least one) of program modules configured to perform the functions of various embodiments of the present disclosure.

A program/utility 18 having a set (at least one) of the program modules 17 may be stored in, for example, the memory 12. The program modules 17 include but are not limited to, an operating system, one or more application programs, other programs modules, and program data. Each of these examples, or some combination thereof, may include an implementation of a network environment. The program modules 17 generally perform the functions and/or methods in the embodiments described herein.

The query processing device may also communicate with one or more external devices 19 (such as, a keyboard, a pointing device, a display 20, etc.). Furthermore, the query processing device may also communicate with one or more communication devices enabling a user to interact with the query processing device and/or other devices (such as a network card, modem, etc.) enabling the query processing device to communicate with one or more computer devices. This communication can be performed via the input/output (I/O) interface 21. Also, the query processing device may communicate with one or more networks (such as a local area network (hereafter referred to as LAN), a wide area network (hereafter referred to as WAN) and/or a public network such as an Internet) through a network adapter 22. As shown, the network adapter 22 communicates with other modules of the query processing device over the bus 13. It should be understood that, although not shown, other hardware and/or software modules may be used in connection with the query processing device. The hardware and/or software includes, but is not limited to, microcode, device drivers, redundant processing units, external disk drive arrays, RAID systems, tap Drive and data backup storage system.

The processing unit 11 is configured to execute various functional applications and data processing by running at least one of the programs stored in the memory 12, for example, implementing the query processing method in embodiments of the present disclosure.

Embodiments of the present disclosure further provide a computer readable medium including computer program stored thereon. When the computer program is executed by a processor, the above method is executed.

Those skilled in the art will appreciate that all or some of the steps, systems, and functional blocks/units of the methods disclosed above may be implemented as software, firmware, hardware, and suitable combinations thereof. In an implementation of hardware, the division between functional modules/units mentioned above does not necessarily correspond to the division of physical components. For example, one physical component may have multiple functions, or one function or step may be implemented by a plurality of physical components together. Certain physical components or all physical components may be implemented as software executed by a processor, such as a central processing unit, a digital signal processor or a microprocessor, or implemented as hardware, or implemented as an integrated circuit, such as an application specific integrated circuit. Such software may be distributed on a computer readable medium, which may include computer storage mediums (or non-transitory media) and communication mediums (or transitory media). As is well known to those skilled in the art, the term computer storage medium includes volatile and nonvolatile, removable and non-removable medium implemented in any method or technology for storing information, such as computer readable instructions, data structures, program modules or other data. Computer storage mediums include, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage device, or any other medium used to store the desired information and that can be accessed by the computer. Moreover, it is well known to those skilled in the art that the communication medium typically includes computer readable instructions, data structures, program modules, or other data in a modulated data signal, such as a carrier wave or other transport mechanism, and can include any information delivery medium.

The example embodiments have been disclosed herein, although specific terms are employed, they are intended to be used only as a generic description and are not intended to be limiting. In some instances, it is apparent to those skilled in the art that the features, characteristics and/or elements described in combination with the specific embodiments may be used alone, or may be used in combination with features, characteristics and/or components that may be described in other embodiments. Therefore, it will be understood by those skilled in the art that various changes in form and detail may be made without departing from the scope of the disclosure.

What is claimed is:

1. A query processing method, comprising:
   determining a query feedback based on a received query request comprising a character string, wherein, the query feedback refers to a result obtained by searching with the query request;
   determining a target candidate entity set corresponding to the character string based on the query feedback and a preset knowledge base, wherein, the target candidate entity set comprises candidate entities corresponding to the character string;
   evaluating each target candidate entity in the target candidate entity set to obtain evaluation results, wherein a target candidate entity corresponds to an evaluation result; and
   determining a category of each target candidate entity based on the evaluation result of the target candidate entity;
   wherein determining the target candidate entity set corresponding to the character string based on the query feedback and the preset knowledge base, comprises:
   determining a first candidate entity subset based on the query feedback and the character string, wherein the first candidate entity subset is obtained at least by extracting all or a part of candidate entities from the query feedback through matching the character string with the query feedback;

determining a second candidate entity subset from the preset knowledge base based on the character string, wherein the second candidate entity subset is obtained at least by selecting a plurality of entity items associated with the character string from the knowledge base; and determining the target candidate entity set based on the first candidate entity subset and the second candidate entity subset.

2. The method according to claim 1, wherein evaluating each target candidate entity in the target candidate entity set, comprises:

calculating a similarity of each target candidate entity in the target candidate entity set with the query feedback as the evaluation result of the target candidate entity.

3. The method according to claim 1, wherein evaluating each target candidate entity in the target candidate entity set, comprises:

inputting the target candidate entity set and the query feedback respectively to a dual-channel model, to obtain the evaluation results corresponding to respective target candidate entities.

4. The method according to claim 1, wherein determining the category of each target candidate entity based on the evaluation result of the target candidate entity, comprises:

comparing the evaluation result of a target candidate entity with a preset result; and determining the target candidate entity as an entity of a first category when the evaluation result of the target candidate entity meets at least one conditions of:

the evaluation result of the target candidate entity being superior to the preset result; and the evaluation result of the target candidate entity being identical to the preset result.

5. The method according to claim 4, further comprising:

determining the target candidate entity as an entity of a second category when the evaluation result of the target candidate entity is inferior to the preset result.

6. The method according to claim 4, further comprising:

determining a search intent entity corresponding to the received query request based on the target candidate entity set and the evaluation results corresponding to respective target candidate entities.

7. The method according to claim 6, wherein determining the search intent entity corresponding to the received query request based on the target candidate entity set and the evaluation results corresponding to respective target candidate entities, comprises:

selecting an optimal evaluation result from the evaluation results corresponding to respective target candidate entities; and determining the target candidate entity corresponding to the optimal evaluation result as the search intent entity.

8. The method according to claim 1, wherein the query feedback includes one or more of news, information, related search, encyclopedia, and post bar.

9. A query processing device, comprising:

a processor;

a memory, having computer programs executable by the processor;

wherein when the computer programs are executed by the processor, the processor is caused to perform followings:

determining a query feedback based on a received query request comprising a character string, wherein, the query feedback refers to a result obtained by searching with the query request;

determining a target candidate entity set corresponding to the character string based on the query feedback and a preset knowledge base, wherein, the target candidate entity set comprises candidate entities corresponding to the character string;

evaluating each target candidate entity in the target candidate entity set to obtain evaluation results, wherein a target candidate entity corresponds to an evaluation result; and determining a category of each target candidate entity based on the evaluation result of the target candidate entity;

wherein determining the target candidate entity set corresponding to the character string based on the query feedback and the preset knowledge base comprises:

determining a first candidate entity subset based on the query feedback and the character string, wherein the first candidate entity subset is obtained at least by extracting all or a part of candidate entities from the query feedback through matching the character string with the query feedback;

determining a second candidate entity subset from the preset knowledge base based on the character string, wherein the second candidate entity subset is obtained at least by selecting a plurality of entity items associated with the character string from the knowledge base; and determining the target candidate entity set based on the first candidate entity subset and the second candidate entity subset.

10. The device according to claim 9, wherein evaluating each target candidate entity in the target candidate entity set, comprises:

calculating a similarity of each target candidate entity in the target candidate entity set with the query feedback as the evaluation result of the target candidate entity.

11. The device according to claim 9, wherein evaluating each target candidate entity in the target candidate entity set, comprises:

inputting the target candidate entity set and the query feedback respectively to a dual-channel model, to obtain the evaluation results corresponding to respective target candidate entities.

12. The device according to claim 9, wherein determining the category of each target candidate entity based on the evaluation result of the target candidate entity, comprises:

comparing the evaluation result of a target candidate entity with a preset result; and determining the target candidate entity as an entity of a first category when the evaluation result of the target candidate entity meets at least one conditions of:

the evaluation result of the target candidate entity being superior to the preset result; and the evaluation result of the target candidate entity being identical to the preset result.

13. The device according to claim 12, wherein the processor is further caused to perform:

determining the target candidate entity as an entity of a second category when the evaluation result of the target candidate entity is inferior to the preset result.

14. The device according to claim 12, wherein the processor is further caused to perform:

determining a search intent entity corresponding to the received query request based on the target candidate entity set and the evaluation results corresponding to respective target candidate entities.

15. The device according to claim 14, wherein determining the search intent entity corresponding to the received query request based on the target candidate entity set and the evaluation results corresponding to respective target candidate entities, comprises:
   selecting an optimal evaluation result from the evaluation results corresponding to respective target candidate entities; and
   determining the target candidate entity corresponding to the optimal evaluation result as the search intent entity.

16. A non-transitory computer readable medium having a computer program stored thereon, wherein when the computer program is executed by a processor, the processor is caused to perform:
   determining a query feedback based on a received query request comprising a character string, wherein, the query feedback refers to a result obtained by searching with the query request;
   determining a target candidate entity set corresponding to the character string based on the query feedback and a preset knowledge base, wherein, the target candidate entity set comprises candidate entities corresponding to the character string;
   evaluating each target candidate entity in the target candidate entity set to obtain evaluation results, wherein a target candidate entity corresponds to an evaluation result; and
   determining a category of each target candidate entity based on the evaluation result of the target candidate entity;
   wherein determining the target candidate entity set corresponding to the character string based on the query feedback and the preset knowledge base comprises:
   determining a first candidate entity subset based on the query feedback and the character string, wherein the first candidate entity subset is obtained at least by extracting all or a part of candidate entities from the query feedback through matching the character string with the query feedback;
   determining a second candidate entity subset from the preset knowledge base based on the character string, wherein the second candidate entity subset is obtained at least by selecting a plurality of entity items associated with the character string from the knowledge base; and
   determining the target candidate entity set based on the first candidate entity subset and the second candidate entity subset.

* * * * *